3,778,499
ATMOSPHERE PURIFICATION OF RADON AND RADON DAUGHTER ELEMENTS

Lawrence Stein, Downers Grove, Ill., assignor to the United States of America as represented by the United States Atomic Energy Commission
No Drawing. Filed Apr. 13, 1971, Ser. No. 133,704
The portion of the term of the patent subsequent to May 2, 1989, has been disclaimed
Int. Cl. B01d 53/34
U.S. Cl. 423—210                8 Claims

ABSTRACT OF THE DISCLOSURE

A method for purifying an atmosphere of radon and radon daughter elements which may be contained therein by contacting the atmosphere with a fluorinating solution, whereby the radon and radon daughters are oxidized to their respective fluorides. The fluorides dissolve in the fluorinating solution and are removed from the atmosphere, which may then be recirculated.

CONTRACTUAL ORIGIN OF THE INVENTION

The invention described herein was made in the course of, or under, a contract with the United States Atomic Energy Commission.

BACKGROUND OF THE INVENTION

Radon is a heavy, radioactive gaseous element formed by the alpha disintegration of radium. The most common isotope, $^{222}Rn$, is an alpha emitter, with a half-life of 3.8 days. Radon is inherently associated with radium in uranium ores and, with its radioactive daughters, constitutes a potential health hazard in uranium mining and ore handling operations. The daughters are solids and tend to be retained in the lungs, where they may ultimately cause cancer.

Forced ventilation is generally used to lower the concentrations of the radioactive elements in the air, but it is often difficult to lower the concentrations adequately in all parts of a mine by this method, since the gaseous radon diffuses continuously from exposed veins of uranium ore and from piles of the broken ore.

SUMMARY OF THE INVENTION

I have developed a method by which the above problem can be eliminated or at least reduced. By my method, the atmosphere within a uranium mine or any atmosphere may be purified of any radon and radon daughters which it may contain by contacting the atmosphere with a radon-fluorinating solution such as a fluoride-containing oxidant which will quantitatively remove the elements from the atmosphere. The fluorinating solution does this by oxidizing the radon and radon daughters to their respective fluorides which then dissolve in the solution and are thereby removed from the air which then may be recirculated without fear of radiation hazard.

The method of this invention is also useful for the quantitative collection of radon and radon daughter elements for analytical purposes.

It is therefore one object of this invention to provide a method for quantitatively recovering radon and radon daughter elements for analytical purposes.

It is another object of this invention to provide a method for purifying an atmosphere of any radon and radon daughter elements which may be contained therein.

Finally it is the object of this invention to provide a method for purifying the atmosphere of uranium mines by removal of the radon and radon daughter elements associated therewith.

DESCRIPTION OF THE PREFERRED EMBODIMENT

These and other objects may be attained by passing the atmosphere containing the radon and radon daughters through a fluorinating solution, whereby the radon and radon daughter elements are oxidized to their respective fluoride compounds and dissolved in the solution; the purified atmosphere may then be recirculated.

The fluorinating solution consists of a fluoride-containing oxidant and a solvent. The oxidant may be any fluorine compound with sufficient oxidizing power to convert elemental radon to radon fluoride. These oxidants include a number of the halogen fluorides, such as $ClF$, $ClF_3$, $ClF_5$, $BrF_3$, $BrF_5$ and $IF_7$, and compounds which contain hexafluoronickelate ions, such as $K_2NiF_6$ and $K_3NiF_6$. The halogen fluorides may be used alone or dissolved in a suitable nonaqueous solvent such as another halogen fluoride or hydrogen fluoride. Of the halogen fluorides, bromine trifluoride is most suitable for use as an oxidant, since it has a low vapor pressure (approximately 8 torr at 25° C.).

The solvent can consist of any liquid which dissolves but does not reduce the oxidant, radon fluoride, or fluorides of radon daughter elements. The solvent must be water free to prevent hydrolysis of the fluorinating agents and of the radon fluoride compounds formed. A number of solvents known to be suitable include iodine pentafluoride, antimony pentafluoride and anhydrous hydrogen fluoride in addition to the halocarbon oils such as polymers of chlorotrifluoroethylene. Fluoride salts can also be dissolved in the solutions of liquid halogen fluorides to reduce the vapor pressures. Alkali metal fluorides such as LiF, NaF, KF, RbF and CsF and other soluble fluoride salts can be used for this purpose. The concentration of a salt can range from zero concentration to the limit of solubility of the salt in the solution.

The concentration of radon oxidant to solvent may range from 0.1 mole percent to the limit of solubility of the oxidant in the solution. If the oxidant is a liquid and miscible in all proportions with the solvent, the concentration of oxidant can range from 0.1 to 100 mole percent.

This method can be used at temperatures between $-155°$ and $100°$ C. For each pure oxidant or combination of oxidant, solvent and salt, the minimum operating temperature is determined by the freezing point of the liquid and the maximum operating temperature by the vapor pressure of the liquid. Pure bromine trifluoride can be used at temperatures between 9° and 50° C. and pure chlorine monofluoride at temperatures between $-155°$ and $-140°$ C. In the most favorable instances, liquids can be selected for use at ambient temperatures. Many binary and ternary liquids suitable for use at ambient temperatures in the vicinity of 25° C. can be prepared with oxidants selected from the group $BrF_3$, $BrF_5$, $ClF_3$, $ClF_5$, $IF_7$, $K_2NiF_6$ and $K_3NiF_6$; with salts selected from the group LiF, NaF, KF, RbF and CsF; and with solvents selected from the group HF, $IF_5$, $SbF_5$ and halocarbon oils.

If the atmosphere from which the radon and radon daughter elements are to be removed is very humid, it may be necessary to dry the air before it is contacted with the fluorinating solution, since water vapor decomposes radon fluoride and the fluorinating reagents. This drying step may be accomplished by passing the humid atmosphere through a desiccant such as anhydrous calcium sulfate, magnesium perchlorate or silica gel or by passing the air over refrigeration coils to remove the water by condensation.

It may be necessary to remove vapors of oxidants or solvents from the radon-free atmosphere before it can be recirculated should the fluorinating solution contain reagents having high vapor pressures. These vapors may be removed by passing the air over cooling coils to condense the vapor or through a chemical such as soda lime or activated alumina that will react with and remove the vapors or both.

An apparatus for removing radon and radon daughters from the air of a uranium mine would consist of the following parts: (1) an air drying unit; (2) a radon and radon daughter fluorinating unit; (3) a vapor trapping unit; and (4) a pump or blower for forcing the air through the three successive units. The air in a mine is generally very humid, and since water vapor decomposes radon fluoride and the fluorinating reagents, the air must be dried before it is passed through the second unit.

In the second unit, the dry air is brought into contact with a liquid halogen fluoride or fluorinating solution, which converts the elemental radon and radon daughters to their respective fluorides. The fluorides dissolve in the liquid phase and are thereby removed from the air stream. Several types of gas-liquid contact devices can be used, including the following: bubble-cap columns; packed beds, in which the liquid and gas phases flow countercurrently over inert support materials, such as calcium fluoride, magnesium fluoride or fluorinated plastics; bubble trains, in which the gas flows through a succession of chambers containing the liquid phase and is dispersed as fine bubbles by passage through small holes or frits; mechanical devices, in which the gas and liquid phases are brought into intimate contact by being shaken or agitated together.

Any vapors of oxidants or solvents escaping from the second unit are trapped in the third unit. The third unit contains either cooling coils that condense the vapors, chemicals, such as soda lime or activated alumina, that react with and remove the vapors, or both. Only a small amount of vapor must be removed from the air in the third unit if a fluorinating liquid with a low vapor pressure is used in the second unit.

The pump or blower could be any conventional unit having sufficient capacity to move an adequate amount of air through the preceding units.

An apparatus for the collection of radon and radon daughters from air samples for analysis would consist essentially of the same units as previously described except that they could be on a much smaller scale. If the air to be sampled is not very humid, or if a sufficient amount of reagent is present in the fluorinating unit to react with the water vapor, radon and radon daughters without being depleted, the drying unit can be eliminated. If the vapor pressure of the liquid in the fluorinating unit is very low, or if the air sample is small, the vapor trapping unit can also be eliminated. For small air samples the air pump could also be replaced by an evacuated vessel of known volume; atmospheric pressure can then be used to force air through the three units and into the vessel as the latter is slowly opened through a needle valve.

The radon and radon daughters dissolve in the liquid of the second unit after they are converted to fluorides. The liquid can be counted for $\gamma$-activity to determine lead-214 and bismuth-214; after equilibrium is established, the amounts of lead-214 and bismuth-214 indicate the amount of radon present. The liquid can also be evaporated to dryness, and the solid residue can then be counted for $\alpha$-activity to determine radon-222, polonium-218, and polonium-214. Gaseous radon-222 can also be liberated by hydrolyzing the residue or the original liquid and can be counted in an ionization chamber, a chamber coated with a layer of zinc phosphide, or a scintillating liquid in which it is soluble.

The following examples are given as illustrative of the process of this invention and are not to be taken as limiting the scope or extent of the invention.

EXAMPLE I

The method described has been used to remove radon quantitatively from synthetic radon-air mixtures containing higher concentrations of radon than ordinary air or the air in a uranium mine. In the first test of the method, a mixture of 3.08 mCi (millicurie) of radon-222 and 0.69 liter of dry air (STP) was bubbled through liquid bromine trifluoride in two Kel-F plastic test tubes, which were connected in series on a metal vacuum line. Each tube contained 4.0 ml. of bromine trifluoride at room temperature (approximately 23° C.). The gas was dispersed as very fine bubbles by a stainless steel frit in each tube. After leaving the second tube, the gas flowed through a third tube, which was cooled with liquid nitrogen. Any radon passing through the first two tubes without reacting with the bromine trifluoride was expected to condense in the third tube. The average gas flow rate was 3.03 ml./minute. At the conclusion of the experiment, the position of the radon was determined by measuring the $\gamma$-emission of the daughters lead-214 and bismuth-214 from each tube. The measurements were repeated after several hours, when radon and the short-lived daughters were known to be in radioactive equilibrium. Radon and radon daughters were found only in the first tube; no $\gamma$-emission was detected from the second or third tube. When the apparatus was disassembled, metal parts which had been in contact with the liquid in the first tube were found to be highly radioactive, but metal parts from the second and third tubes were found to be inactive. The radon and daughters were therefore removed from the air stream with very high efficiency in the first stage of the process.

EXAMPLE II

Similar results were obtained with mixtures of 3.21 mCi of radon-0.96 liter of air and 1.85 mCi of radon-0.78 liter of air, which were passed through liquid bromide trifluoride at room temperature in an apparatus similar to that described in Example I at average flow rates of 2.87 and 2.90 ml./minute, respectively. In each instance, radon and radon daughters were found only in the first tube.

It can be seen from the above experiments that the method of this invention will quantitatively remove radon and radon daughter elements from the atmosphere containing the same.

The gas flow rates used in the test experiments were very low, due to the small dimensions of the apparatus. Much higher flow rates would be used in large-scale equipment for purifying the air in a uranium mine. In an enclosed section of a mine, a suitable flow rate would be determined by the volume of the enclosure, the exposed surface area, the rate of diffusion of radon from ore to air per unit surface area and the rate of introduction of fresh air. The concentration of radon in the air would be determined by the equilibrium between the rate of influx and the rate of removal of radon.

It is to be understood that the invention is not to be limited by the details given herein but that it may be modified within the scope of the appended claims.

The embodiments of the invention in which an exclusive property or privilege is claimed are defined as follows:

1. A method of purifying an atmosphere of radon and radon daughter elements which may be contained therein comprising: drying the atmosphere to remove any moisture contained therein; contacting the atmosphere with a fluorinating solution containing a fluoride-containing oxidant selected from the group consisting of $ClF$, $ClF_3$, $ClF_5$, $BrF_3$, $BrF_5$, $IF_7$, $K_2NiF_6$ and $K_3NiF$ whereby the radon and radon daughter elements are oxidized to their respective fluorides which dissolve in the solution; and recirculating the purified atmosphere.

2. The method of claim 1 comprising removing any fluorinating solution which may remain in the atmosphere before recirculating the purified atmosphere.

3. The method of claim 2 wherein the radon and radon daughter containing atmosphere is contacted with the fluorinating solution at a temperature of $-155$ to $100°$ C.

4. The method of claim 3 wherein the fluorinating solution is a fluoride containing oxidant selected from the group consisting of ClF, ClF$_3$, ClF$_5$, BrF$_3$, BrF$_5$ and IF$_7$.

5. The method of claim 1 wherein the oxidant is dissolved in a water-free nonreducing solvent selected from the group consisting of IF$_5$, SbF$_5$, HF and halocarbon oils.

6. The method of claim 5 wherein the solvent contains at least 0.1 mole of oxidant.

7. The method of claim 6 wherein the fluorinating solution also contains an alkali metal fluoride salt selected from the group consisting of LiF, NaF, KF, RbF and CsF.

8. A method of purifying an atmosphere of radon and radon daughter elements which may be contained therein comprising: drying said atmosphere to remove any moisture contained therein, contacting said dried atmosphere at ambient temperature with a fluorinating solution of bromine trifluoride whereby the radon and radon daughter elements contained therein are oxidized to their respective fluorides and dissolved in the bromide trifluoride thus purifiyng the atmosphere, removing any bromine trifluoride which may remain in the atmosphere and recirculating purified atmosphere.

References Cited

UNITED STATES PATENTS

| | | | |
|---|---|---|---|
| 3,185,548 | 5/1965 | Fields et al. | 23—205 |
| 3,326,638 | 6/1967 | Cleaver | 23—205 |
| 3,377,136 | 4/1968 | Morrow | 23—205 |
| 3,660,300 | 5/1972 | Stein | 252—301.1 R |

EARL C. THOMAS, Primary Examiner

U.S. Cl. X.R.

423—249, 262, 462, 489; 252—301.1 R